(12) United States Patent
Jakobs

(10) Patent No.: US 8,799,318 B2
(45) Date of Patent: Aug. 5, 2014

(54) FUNCTION MODULE LEVERAGING FUZZY SEARCH CAPABILITY

(75) Inventor: Daniel Jakobs, Walldorf (DE)

(73) Assignee: SAP AG, Walldorf, DE (US)

(*) Notice: Subject to any disclaimer, the term of this patent is extended or adjusted under 35 U.S.C. 154(b) by 0 days.

(21) Appl. No.: 13/560,432

(22) Filed: Jul. 27, 2012

(65) Prior Publication Data

US 2014/0032598 A1  Jan. 30, 2014

(51) Int. Cl.
*G06F 17/30* (2006.01)

(52) U.S. Cl.
CPC ...... *G06F 17/30542* (2013.01); *G06F 17/3056* (2013.01)
USPC ........................................ 707/780

(58) Field of Classification Search
USPC ........................................ 707/780
See application file for complete search history.

(56) References Cited

U.S. PATENT DOCUMENTS

| | | | |
|---|---|---|---|
| 5,819,251 A * | 10/1998 | Kremer et al. | 1/1 |
| 8,352,495 B2 * | 1/2013 | LaRowe et al. | 707/780 |
| 2002/0143746 A1 * | 10/2002 | Levy et al. | 707/2 |
| 2004/0225643 A1 * | 11/2004 | Alpha et al. | 707/3 |
| 2010/0332475 A1 * | 12/2010 | Birdwell et al. | 707/737 |

OTHER PUBLICATIONS

Campi, A., Guinea, S., & Spoletini, P. (2006). A fuzzy extension for the XPath query language. In Flexible Query Answering Systems (pp. 210-221). Springer Berlin Heidelberg.*

Ma, Z. M., & Yan, L. (2008). A literature overview of fuzzy database models. Journal of Information Science and Engineering, 24(1), 189.*

Škrbić, S., Racković, M., & Takači, A. (2011). Towards the methodology for development of fuzzy relational database applications. Computer Science and Information Systems, 8(1), 27-40.*

Skrbic, Srdjan, and Aleksandar Takači. "On Development of Fuzzy Relational Database Applications." Proceedings of IPMU. vol. 8.*

Internet article "SAP HANA Database—SQL Reference Manual," SAP HANA Application Software SPS 04. Dated May 9, 2012.

Internet article "SAP HANA Developer's Guid for the SQL Function Fuzzy Search," SAP HANA Appliance Software SPS 04. Document Version 1.0, dated Apr. 30, 2012.

Internet article "SAP HANA Reference," internet address: http://help/sa.com/hana/html/sql_create_table.html. Printed Jun. 23, 2012.

* cited by examiner

*Primary Examiner* — James Trujillo
*Assistant Examiner* — William Spieler
(74) *Attorney, Agent, or Firm* — Fountainhead Law Group PC

(57) ABSTRACT

A function module allows fuzzy searching of data stored in an environment lacking inherent fuzzy search capability, by leveraging a native fuzzy search capability of an underlying database. The function module receives the data that is to be searched, as well as search terms/parameters. The function module creates a temporary table in the database, populates the table with the corresponding data, and executes the fuzzy search on the table according to the terms/parameters utilizing the database layer's native fuzzy search capability. After returning the fuzzy search result, the function module removes the table from the database. One embodiment implements the function module with the Advanced Business Application Program (ABAP) environment available from SAP AG, which lacks an inherent ability to perform fuzzy searching. That function module leverages native fuzzy search capability of an underlying in-memory HANA database architecture database available from SAP AG.

17 Claims, 5 Drawing Sheets

FUNCTION MODULE LEVERAGING FUZZY SEARCH CAPABILITY

BACKGROUND

Embodiments of the present invention relate to fuzzy searching, and in particular, to a function module that leverages off of an existing fuzzy search capability.

Unless otherwise indicated herein, the approaches described in this section are not prior art to the claims in this application and are not admitted to be prior art by inclusion in this section.

Fuzzy searching offers a user the ability to obtain results matching a search query in an inexact manner. While fuzzy searching can be valuable, it may not be supported in certain environments.

For example interface layers communicating information to, and receiving information from, an underlying database layer, may not be configured to handle fuzzy searching. This may be true notwithstanding the fact that the database layer itself is capable of performing fuzzy searching.

Accordingly, the present disclosure addresses these and other issues with systems and methods for implementing fuzzy searching.

SUMMARY

A function module allows fuzzy searching of data stored in an environment lacking inherent fuzzy search capability, by leveraging a native fuzzy search capability of an underlying database. The function module receives the data that is to be searched, as well as search terms/parameters. The function module creates a temporary table in the database, populates the table with the corresponding data, and executes the fuzzy search on the table according to the terms/parameters utilizing the database layer's native fuzzy search capability. After returning the fuzzy search result, the function module removes the table from the database. One embodiment implements the function module with the Advanced Business Application Program (ABAP) environment available from SAP AG, which lacks an inherent ability to perform fuzzy searching. That function module leverages native fuzzy search capability of an underlying in-memory HANA database architecture database available from SAP AG.

An embodiment of a computer-implemented method comprises providing a function module within an environment in communication with a database layer having a native fuzzy search capability. The function module is caused to receive a fuzzy search request for data stored in the environment. A temporary database table including the data is created in the database layer. The fuzzy search request is performed on the temporary database table utilizing the native fuzzy search capability, and fuzzy search results are exported.

An embodiment of a non-transitory computer readable storage medium embodies a computer program for performing a method comprising providing a function module within an environment in communication with a database layer having a native fuzzy search capability. The function module is caused to receive a fuzzy search request for data stored in the environment. A temporary database table including the data is created in the database layer. The fuzzy search request is performed on the temporary database table utilizing the native fuzzy search capability, and fuzzy search results are exported.

An embodiment of a computer system comprises one or more processors and a software program executable on said computer system. The software program is configured to provide a function module within an environment in communication with a database layer having a native fuzzy search capability. The software program is configured to cause the function module to receive a fuzzy search request for data stored in the environment. The software program is further configured to create in the database layer, a temporary database table including the data. The software program is also configured to perform the fuzzy search request on the temporary database table utilizing the native fuzzy search capability, and to export fuzzy search results.

In certain embodiments the fuzzy search request is performed according to a term imported by the function module.

According to some embodiments the fuzzy search request is performed according to a parameter imported by the function module.

In various embodiments the database layer comprises an in-memory architecture.

According to particular embodiments the native fuzzy search capability is based upon a CONTAINS operator.

Some embodiments further comprise removing the temporary database table.

In various embodiments the temporary table is removed after the user exits the environment.

The following detailed description and accompanying drawings provide a better understanding of the nature and advantages of particular embodiments.

DETAILED DESCRIPTION

Described herein are techniques for allowing fuzzy database searching. The apparatuses, methods, and techniques described below may be implemented as a computer program (software) executing on one or more computers. The computer program may further be stored on a computer readable medium. The computer readable medium may include instructions for performing the processes described below.

In the following description, for purposes of explanation, numerous examples and specific details are set forth in order to provide a thorough understanding of the present invention. It will be evident, however, to one skilled in the art that the present invention as defined by the claims may include some or all of the features in these examples alone or in combination with other features described below, and may further include modifications and equivalents of the features and concepts described herein.

Figure 1:
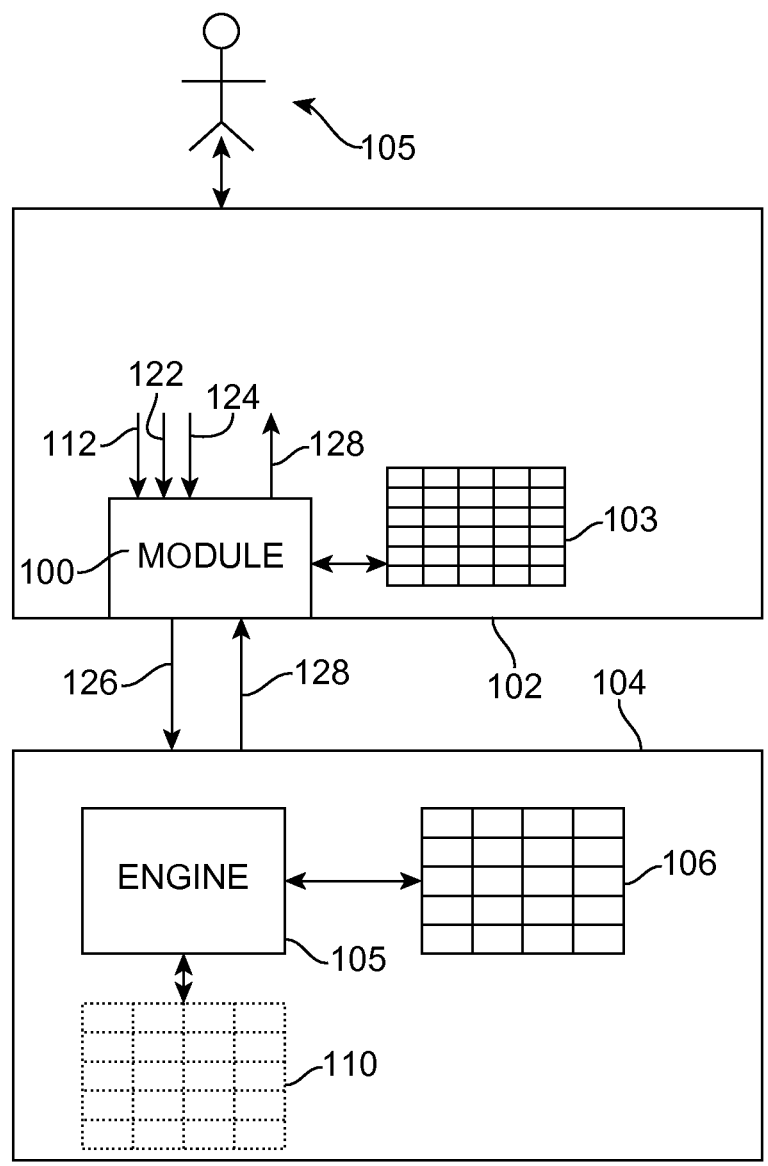
FIG. 1 shows a simplified view of a database system including a fuzzy search function module according to an embodiment.

FIG. 1 shows a simplified view of a database system including a fuzzy database search function module according to an embodiment. Function module 100 is located within an environment 102 that is in communication with an underlying database layer 104, and is also in communication with a user 105.

Data is stored within environment 102, for example in an internal table 103. Environment 102 lacks any inherent capability for performing fuzzy searching of the internally stored data.

The underlying database layer 104, however, does have a native fuzzy search capability. In particular, database engine 105 is configured to perform fuzzy searching of data stored as database tables 106 within the database layer.

Accordingly, function module 100 is configured to receive from the environment, a request to perform a fuzzy search of the data 103 stored internal to the environment. In response the function module is configured to communicate with the database engine in order to create and temporarily store, a new database table 110 within the database layer.

The function module will then insert given rows into the temporary table of the database layer, based upon a user input 112. This user input identifies the data stored internal to the environment, that is to be the subject of the fuzzy search.

Once the temporary database has been created and populated, the function module is poised to receive additional user input. One such user input 122 is in the form of one or more terms for performing the fuzzy search. Another user input 124 is in the form of one or more parameters for performing the fuzzy search.

Based upon these user inputs, the function module performs a fuzzy search 126 of the temporary database. The function module returns the fuzzy search results 128 to the user.

Once the fuzzy search has been performed and the search results returned, the function module may remove the temporary table from the database layer. According to some embodiments, the function module may be configured to remove the temporary table as soon after the fuzzy search is performed and the results returned.

Alternatively, however, the temporary database table may not be removed right away, and instead persisted for some period of time. In such embodiments the temporary table may be available for further fuzzy searching utilizing different terms and/or parameters. In some embodiments, a temporary table may be persisted until the user exits the environment of the function module.

Figure 2:
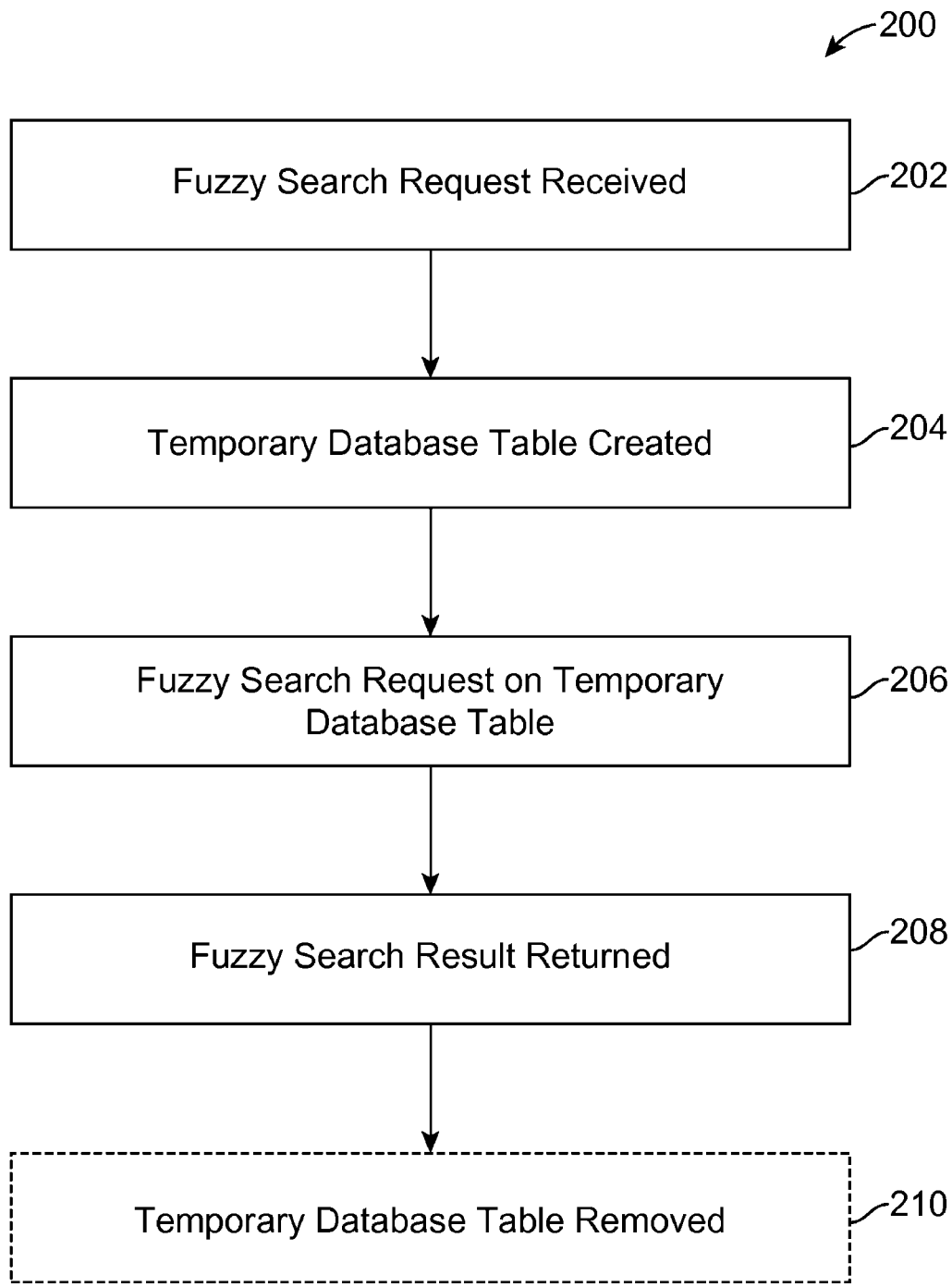
FIG. 2 is a simplified flow diagram showing a method of performing fuzzy searching according to an embodiment.

FIG. 2 is a simplified flow diagram showing a method 200 of performing fuzzy searching according to an embodiment. In a first step 202, a fuzzy search request is received. In a second step 204, a temporary database table is created. In a third step 206, a fuzzy search is performed on the temporary database table according to search terms and search parameters, utilizing a fuzzy search capability native to the database layer. In a fourth step 208 the fuzzy search result is returned. In an optional fifth step 210, the temporary database table is removed.

EXAMPLE

The structure and operation of a function module for fuzzy searching, is now described in connection with a specific database system. Here, the function module is implemented within the Advanced Business Application Program (ABAP) environment serving as an interface to an underlying HANA database of a NetWeaver™ system available from SAP AG of Walldorf, Germany.

In particular, the HANA database offers a SELECT operator called "CONTAINS". This CONTAINS operator serves to perform a fuzzy search on given database table. The CONTAINS operator even provides certain options to fine-tune the fuzzy search.

The overlaying ABAP stack, however, does not offer any similar fuzzy search functionality for internal tables or other data not stored in the underlying database. And, owing to the complexity of implementing fuzzy logic, it would be difficult to develop a separate fuzzy search functionality native to the ABAP environment.

However, the HANA database layer to which the ABAP serves as an interface, is fast and powerful. In particular, the HANA database layer comprises an in-memory architecture wherein data is stored in-memory, and hence is rapidly available for processing and analysis.

The in-memory architecture of the HANA database renders it capable of creating a temporary table, and filling that temporary table with a small amount of data, in less than a millisecond. Accordingly, the function module of this example thus leverages the speed and power of the underlying HANA database in order to perform fuzzy search during runtime.

In this example, fuzzy searching is described in the context of an application for booking airline flights. Here the ABAP environment seeks to provide to a user, up-to-date booking data available from a third party vendor that is not stored in a HANA database. Instead, it is received via e.g. a web service, for every request.

For the purposes of this example, it is assumed that the third party vendor does not provide filtering/searching functionality. Hence, it will send the complete booking data for the next <period of time>.

Accordingly, the SAP application (e.g. ABAP) provides an input field that could be used to find booking data for the next <period of time>. Utilizing an embodiment of a function module as described herein, booking data with typographical errors (e.g. "New Yark" rather than "New York") may be accurately located by fuzzy searching, and the result shown on a screen.

In the ABAP environment, a local internal table is a dynamic data object and represents the "given rows". The user input corresponds to the given rows.

For example, the program calls a web service of gathering target airports of a special airline. The web service data will be stored as internal (non-HANA) table.

The user of the program types in "New Yark". With the help of the fuzzy searching afforded by the function module, "New York" will be identified. So the user input in this case would be for example the value of the input field for "destinations".

Figure 3:
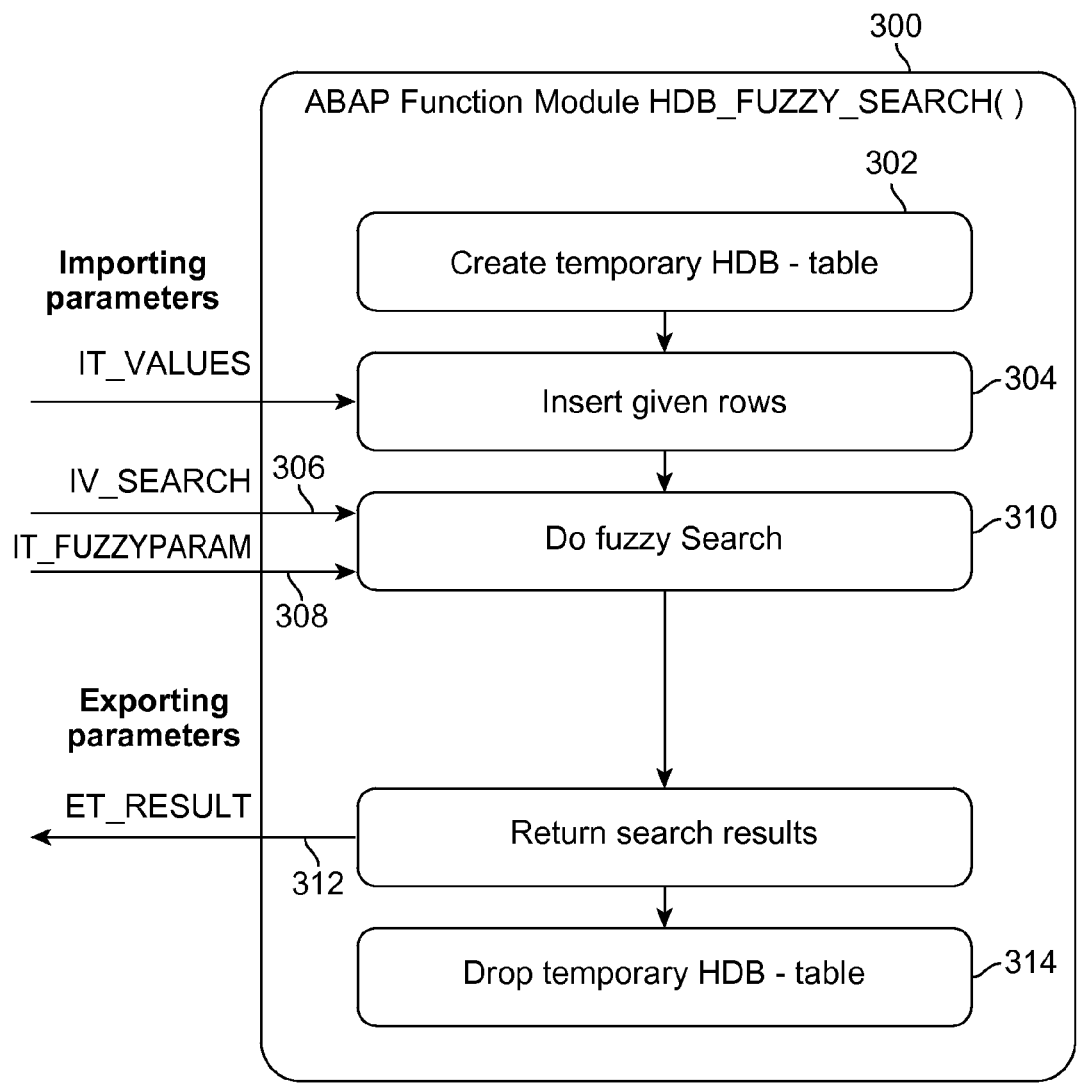
FIG. 3 shows a simplified view of a fuzzy search function module according to an example.

FIG. 3 shows a simplified view of an ABAP function module according to an embodiment that allows fuzzy database searching. In this particular example the function module 300 is named HDB_FUZZY_SEARCH( ).

FIG. 3 shows that in response to being called, the function module 300 will function to create 302 a temporary HANA database table. For the HANA database, global or local temporary tables may be used.

The function module will then insert 304 given rows to the temporary table based upon a user input (here IT_VALUES). The input table (IT_VALUES) corresponds to the list of booking data received via technology other than the in-memory database having native fuzzy search capability.

FIG. 3 shows that once the temporary database has been created and populated, the function module is poised to receive additional user input. One such user input is in the form of a search string (here IV_SEARCH) 306 for the fuzzy search.

Another user input in the form of fuzzy search parameters (IT_FUZZYPARAM) 308. The search options (IT_PARAMETER) may be set statically by the developer {e.g. to "fuzzy (0.8, 'textsearch=compare')"}.

Based upon these user inputs, the function module performs a fuzzy search 310 of the temporary database. This fuzzy searching exploits the CONTAINS operator available to the HANA database.

The function module then returns 312 the fuzzy search results to the user. Here, these fuzzy search results are exported as the parameter ET_RESULT representing the list of matches.

Once the fuzzy search has been performed and the search results returned, the function module will remove 314 the temporary database table. The temporary table may not be deleted immediately, but rather kept for further usage until the environment (here the ABAP program using the function module) is closed.

The following provides an example of fuzzy search performed according to this example, based upon the fuzzy search term "New Yark" (rather than "New York"):

```
CALL FUNCTION
"HDB_FUZZY_SEARCH"
IMPORTING
    IT_VALUES = my_local_table
    IV_SEARCH = "New Yark"
    IT_PARAMETERS = {ranking80% }
EXPORTING
    ET_RESULT = IT_result_table
```

Fuzzy searching according to various embodiments, may offer certain benefits. For example, embodiments may make it possible to perform fuzzy searching for data internal to an environment that lacks a native fuzzy search capability.

In summary, embodiments leverage off of the existing fuzzy search capability of a database layer, often one with the ability to create and populate a temporary database table with great speed. In this manner, the power and quickness of the underlying database layer may be exploited by a developer to allow fuzzy searching actions to be performed during runtime.

Figure 4:
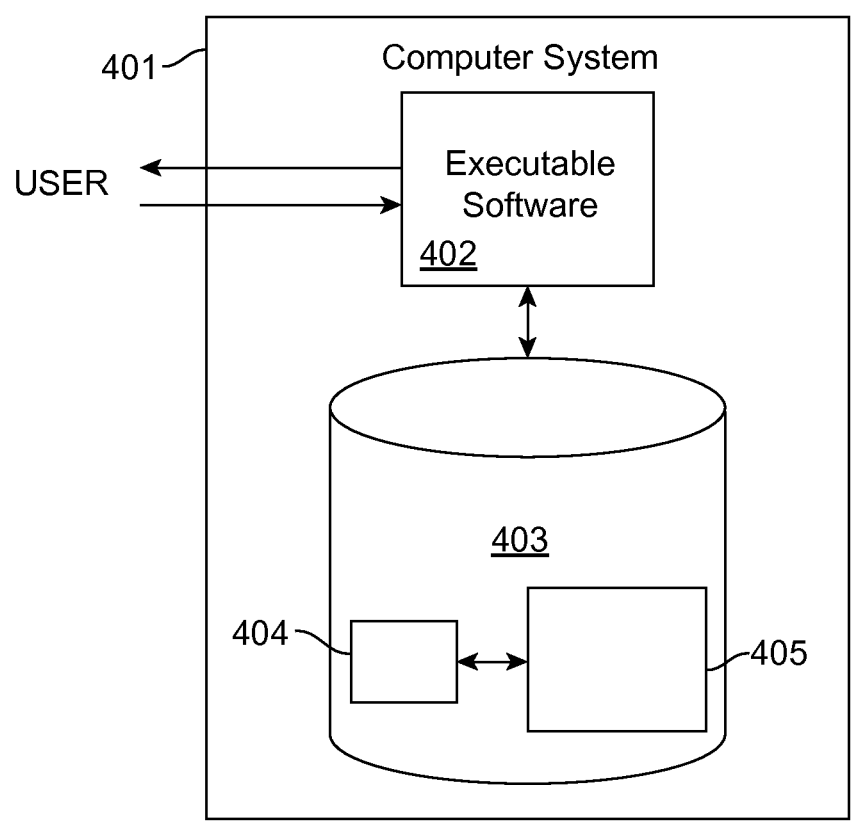
FIG. 4 illustrates hardware of a special purpose computing machine configured to perform fuzzy searching according to an embodiment.

FIG. 4 illustrates hardware of a special purpose computing machine configured to perform fuzzy searching according to an embodiment. In particular, computer system 400 comprises a processor 402 that is in electronic communication with a non-transitory computer-readable storage medium 403. This computer-readable storage medium has stored thereon code 405 corresponding to a fuzzy search module. Code 404 corresponds to a temporary database table created by the fuzzy search module. Code may be configured to reference data stored in a database of a non-transitory computer-readable storage medium, for example as may be present locally or in a remote database server. Software servers together may form a cluster or logical network of computer systems programmed with software programs that communicate with each other and work together in order to process requests.

Figure 5:
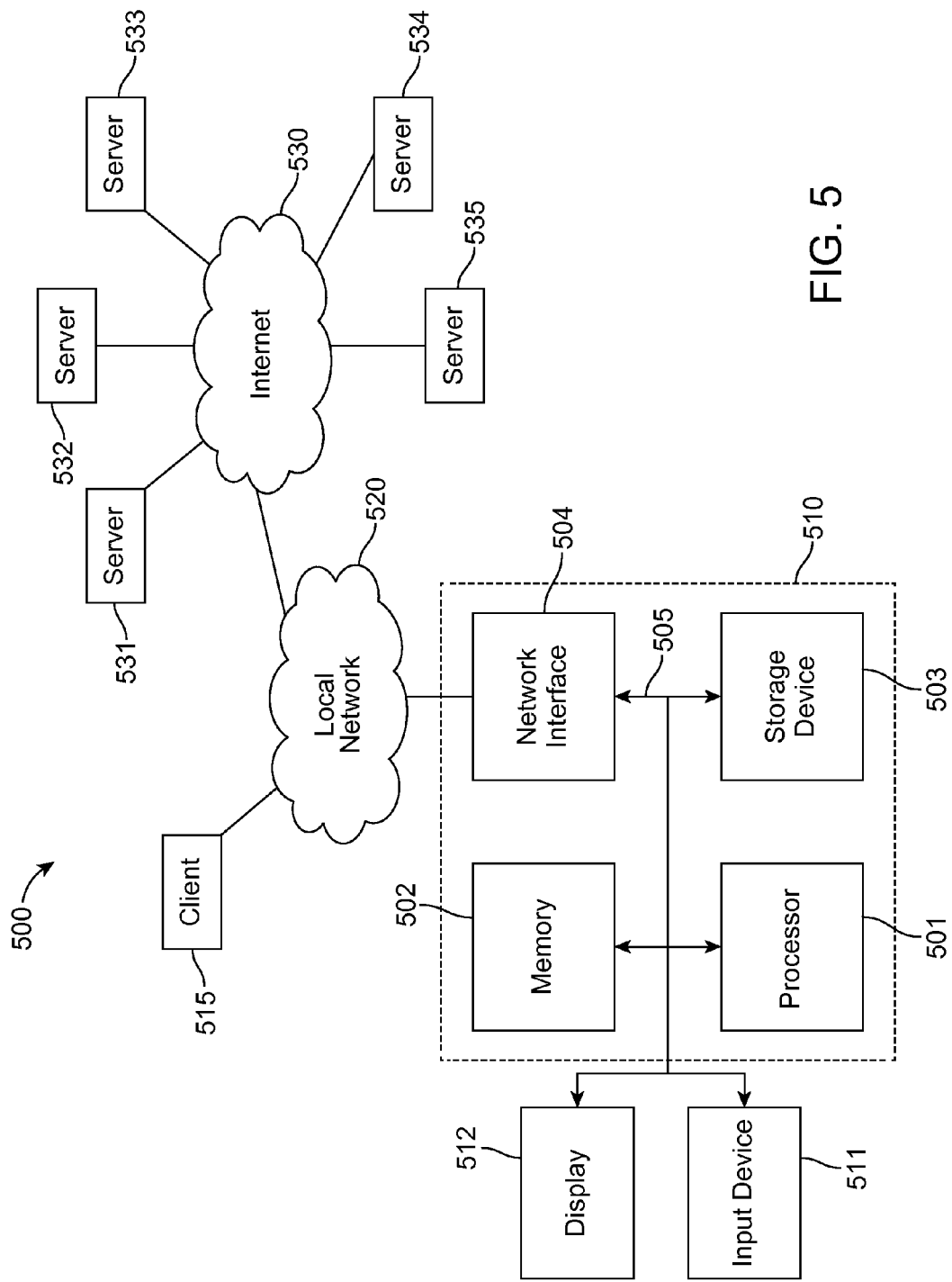
FIG. 5 illustrates an example of a computer system.

An example computer system 510 is illustrated in FIG. 5. Computer system 510 includes a bus 505 or other communication mechanism for communicating information, and a processor 501 coupled with bus 505 for processing information. Computer system 510 also includes a memory 502 coupled to bus 505 for storing information and instructions to be executed by processor 501, including information and instructions for performing the techniques described above, for example. This memory may also be used for storing variables or other intermediate information during execution of instructions to be executed by processor 501. Possible implementations of this memory may be, but are not limited to, random access memory (RAM), read only memory (ROM), or both. A storage device 503 is also provided for storing information and instructions. Common forms of storage devices include, for example, a hard drive, a magnetic disk, an optical disk, a CD-ROM, a DVD, a flash memory, a USB memory card, or any other medium from which a computer can read. Storage device 503 may include source code, binary code, or software files for performing the techniques above, for example. Storage device and memory are both examples of computer readable mediums.

Computer system 510 may be coupled via bus 505 to a display 512, such as a cathode ray tube (CRT) or liquid crystal display (LCD), for displaying information to a computer user. An input device 511 such as a keyboard and/or mouse is coupled to bus 505 for communicating information and command selections from the user to processor 501. The combination of these components allows the user to communicate with the system. In some systems, bus 505 may be divided into multiple specialized buses.

Computer system 510 also includes a network interface 504 coupled with bus 505. Network interface 504 may provide two-way data communication between computer system 510 and the local network 520. The network interface 504 may be a digital subscriber line (DSL) or a modem to provide data communication connection over a telephone line, for example. Another example of the network interface is a local area network (LAN) card to provide a data communication connection to a compatible LAN. Wireless links are another example. In any such implementation, network interface 504 sends and receives electrical, electromagnetic, or optical signals that carry digital data streams representing various types of information.

Computer system 510 can send and receive information, including messages or other interface actions, through the network interface 504 across a local network 520, an Intranet, or the Internet 530. For a local network, computer system 510 may communicate with a plurality of other computer machines, such as server 515. Accordingly, computer system 510 and server computer systems represented by server 515 may form a cloud computing network, which may be programmed with processes described herein. In the Internet example, software components or services may reside on multiple different computer systems 510 or servers 531-535 across the network. The processes described above may be implemented on one or more servers, for example. A server 531 may transmit actions or messages from one component, through Internet 530, local network 520, and network interface 504 to a component on computer system 510. The software components and processes described above may be implemented on any computer system and send and/or receive information across a network, for example.

The above description illustrates various embodiments of the present invention along with examples of how aspects of the present invention may be implemented. The above examples and embodiments should not be deemed to be the only embodiments, and are presented to illustrate the flexibility and advantages of the present invention as defined by the following claims. Based on the above disclosure and the following claims, other arrangements, embodiments, implementations and equivalents will be evident to those skilled in the art and may be employed without departing from the spirit and scope of the invention as defined by the claims.

What is claimed is:

1. A computer-implemented method comprising:
providing a native fuzzy search capability of a database engine in a relational database layer comprising an in-memory architecture, the native fuzzy search capability comprising a SELECT operator;

providing an application layer in communication with the database engine, the application layer lacking fuzzy searching capability and including stored data;

causing the relational database layer to receive a fuzzy search request including a first input from the application layer;

based upon the first input, causing the database engine to create in the relational database layer, a temporary relational database table including a copy of a subset of the data;

in response to a second input from the application layer, performing the fuzzy search request on the temporary relational database table utilizing the native fuzzy search capability; and exporting fuzzy search results from the relational database layer to the application layer.

2. A method as in claim 1 wherein the second input comprises an imported term.

3. A method as in claim 1 wherein the second input comprises an imported parameter.

4. A method as in claim 1 wherein the native fuzzy search capability is based upon a CONTAINS operator.

5. A method as in claim 1 further comprising removing the temporary relational database table.

6. A method as in claim 5 wherein the temporary relational database table is removed after a user exits the relational database layer.

7. A non-transitory computer readable storage medium embodying a computer program for performing a method, said method comprising:

providing a native fuzzy search capability of a database engine in a relational database layer comprising an in-memory architecture, the native fuzzy search capability comprising a SELECT operator;

providing an application layer in communication with the database engine, the application layer lacking fuzzy searching capability and including stored data;

causing the relational database layer to receive a fuzzy search request including a first input from the application layer;

based upon the first input, causing the database engine to create in the relational database layer, a temporary relational database table including a copy of the subset of the data;

in response to a second input from the application layer, performing the fuzzy search request on the temporary relational database table utilizing the native fuzzy search capability; and exporting fuzzy search results from the relational database layer to the application layer.

8. A non-transitory computer readable storage medium as in claim 7 wherein the second input comprises an imported term.

9. A non-transitory computer readable storage medium as in claim 7 wherein the second input comprises an imported parameter.

10. A non-transitory computer readable storage medium as in claim 7 wherein the native fuzzy search capability is based upon a CONTAINS operator.

11. A non-transitory computer readable storage medium as in claim 7 wherein the method further comprises removing the temporary relational database table.

12. A non-transitory computer readable storage medium as in claim 11 wherein the temporary relational database table is removed after the user exits the environment.

13. A computer system comprising:

one or more processors;

a software program, executable on said computer system, the software program configured to:

provide a native fuzzy search capability of a database engine in a relational database layer comprising an in-memory architecture, the native fuzzy search capability comprising a SELECT operator;

provide an application layer in communication with the database engine, the application layer lacking fuzzy searching capability and including stored data;

cause the relational database layer to receive a fuzzy search request including a first input from the application layer;

based upon the first input, causing the database engine to create in the relational database layer, a temporary relational database table including a copy of the subset of the data;

in response to a second input from the application layer, perform the fuzzy search request on the temporary relational database table utilizing the native fuzzy search capability; and export fuzzy search results from the relational database layer to the application layer.

14. A computer system as in claim 13 wherein the second input comprises an imported term.

15. A computer system as in claim 13 wherein the second input comprises an imported parameter.

16. A computer system as in claim 13 wherein the native fuzzy search capability is based upon a CONTAINS operator.

17. A computer system as in claim 13 wherein the software program is further configured to remove the temporary relational database table.

* * * * *